United States Patent
Furumachi

(10) Patent No.: US 12,287,019 B2
(45) Date of Patent: Apr. 29, 2025

(54) ANTIVIBRATION DEVICE

(71) Applicant: Sumitomo Riko Company Limited, Aichi (JP)

(72) Inventor: Naoki Furumachi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 66 days.

(21) Appl. No.: 18/314,078

(22) Filed: May 8, 2023

(65) Prior Publication Data

US 2023/0375062 A1 Nov. 23, 2023

(30) Foreign Application Priority Data

May 17, 2022 (JP) ................. 2022-080667

(51) Int. Cl.
*F16F 15/04* (2006.01)
*F16F 1/38* (2006.01)
*B60K 5/12* (2006.01)

(52) U.S. Cl.
CPC .......... *F16F 1/3849* (2013.01); *B60K 5/1208* (2013.01); *F16F 15/04* (2013.01); *F16F 2230/0005* (2013.01)

(58) Field of Classification Search
CPC .......... D06F 39/125; F16F 15/04; F16M 7/00; F16M 11/36; F16M 11/247; A47B 91/12; A47B 91/04; A47B 91/00
USPC ....... 248/562, 566, 609, 636, 560, 638, 677, 248/188.8, 188.9, 188.2
See application file for complete search history.

(56) References Cited

U.S. PATENT DOCUMENTS

| | | | | |
|---|---|---|---|---|
| 2,458,621 | A * | 1/1949 | Miller | A47B 91/04 16/42 T |
| 5,007,607 | A * | 4/1991 | Kim | H05K 5/0234 248/188.9 |
| 5,153,052 | A * | 10/1992 | Tanaka | B29C 37/0078 428/137 |
| 5,169,115 | A * | 12/1992 | Chung Hsiang | A47B 91/04 411/509 |
| 6,290,201 | B1 * | 9/2001 | Kanie | F16L 3/20 248/68.1 |
| 8,479,899 | B2 * | 7/2013 | Ohtake | F16F 1/371 267/152 |

FOREIGN PATENT DOCUMENTS

JP 2015218754 12/2015

* cited by examiner

Primary Examiner — Alfred J Wujciak
(74) Attorney, Agent, or Firm — JCIPRNET

(57) ABSTRACT

An antivibration device includes a bracket fixed to an antivibration connection target member. A positioning member attached to an attachment hole of the bracket includes a positioning protruding portion inserted into a positioning hole of the antivibration connection target member and positioning the bracket; and a cylindrical attachment portion protruding from the positioning protruding portion and inserted into the attachment hole. The attachment portion has a locking claw protruding toward the outer periphery. The positioning member is positioned with respect to the bracket by sandwiching a peripheral edge portion of the attachment hole between the positioning protruding portion and the locking claw. The peripheral edge portion of the attachment hole has a protrusion that protrudes in the penetrating direction of the attachment hole to adjust and set the thickness of the peripheral edge portion.

6 Claims, 9 Drawing Sheets

ANTIVIBRATION DEVICE

CROSS-REFERENCE TO RELATED APPLICATION

This application claims the priority benefits of Japanese application no. 2022-080667, filed on May 17, 2022. The entirety of the above-mentioned patent application is hereby incorporated by reference herein and made a part of this specification.

BACKGROUND

Technical Field

The disclosure relates to an antivibration device used for a power unit mount or the like of an automobile.

Description of Related Art

Antivibration devices used for automobile power unit mounts or the like have been conventionally known. An antivibration device is disclosed in Japanese Patent Laid-Open No. 2015-218754 (Patent Document 1), for example, and Patent Document 1 has a structure in which a first attachment plate member and a second attachment plate member, which are brackets, are elastically connected by a main rubber elastic body.

The antivibration device of Patent Document 1 is provided with a cap as a guide that defines the relative position of the bracket with respect to a vehicle body. The cap of Patent Document 1 is attached so as to cover a nut and inserted into a positioning hole provided in the vehicle body, thereby relatively positioning the bracket and the vehicle body.

If there is no nut as in Patent Document 1, for example, a structure is adopted in some cases, in which an attachment portion of a positioning member corresponding to the cap of Patent Document 1 is attached to an attachment hole that penetrates the bracket. That is, the attachment portion has a cylindrical shape that can be inserted into the attachment hole as a whole and extends out from a positioning protruding portion inserted into the positioning hole of the vehicle body, and the protruding tip portion is provided with a locking claw that protrudes toward the outer periphery. Then, the attachment portion is inserted into the attachment hole of the bracket, and a peripheral edge portion of the attachment hole is sandwiched between the opposing surfaces of the positioning protruding portion of the positioning member and the locking claw, so that the positioning member is attached to the bracket.

However, in such an attachment structure of the positioning member, the distance between the opposing surfaces of the positioning protruding portion and the locking claw needs to be accurately set with respect to the thickness of the peripheral edge portion of the attachment hole in the bracket, and it is necessary to prepare dedicated positioning members respectively for multiple types of brackets in which the peripheral edge portions of the attachment holes have different thicknesses.

SUMMARY

The disclosure provides an antivibration device having a novel structure that enables a common positioning member to be attached to multiple types of brackets in which the peripheral edge portions of the attachment holes have different thicknesses.

Exemplary aspects for understanding the disclosure are described hereinafter, but each of the aspects described below is described as an example, and it is possible to not only employ the aspects in combination with each other as appropriate but also recognize and employ a plurality of components described in each aspect independently as much as possible, and it is also possible to combine and employ any of the components described in other aspects as appropriate. Accordingly, the disclosure can be implemented in various other aspects without being limited to the aspects described below.

According to the first aspect, an antivibration device including a bracket fixed to an antivibration connection target member is provided. A positioning member is attached to an attachment hole formed through the bracket. The positioning member includes a positioning protruding portion inserted into a positioning hole of the antivibration connection target member and positioning the bracket with respect to the antivibration connection target member; and a cylindrical attachment portion extending from the positioning protruding portion and inserted into the attachment hole of the bracket. A protruding tip portion of the attachment portion is provided with a locking claw protruding toward an outer periphery. The positioning member is positioned with respect to the bracket in a penetrating direction of the attachment hole by sandwiching a peripheral edge portion of the attachment hole between opposing surfaces of the positioning protruding portion and the locking claw. The peripheral edge portion of the attachment hole in the bracket is provided with a protrusion that protrudes in the penetrating direction of the attachment hole to adjust and set a thickness of the peripheral edge portion of the attachment hole.

According to the antivibration device constructed according to this aspect, the thickness of the peripheral edge portion of the attachment hole in the bracket can be easily adjusted and set by the protrusion dimension of the protrusion. Therefore, it is possible to attach a common positioning member to multiple types of brackets having different thicknesses at portions without the protrusion. Since the thickness of the peripheral edge portion of the attachment hole is adjusted by the protrusion dimension of the protrusion, the common positioning member can be attached without changing the thickness of the entire bracket, and the influence on the strength, weight, etc. of the bracket can be suppressed.

According to the second aspect, in the antivibration device according to the first aspect, the bracket is provided with a fixed portion fixed to the antivibration connection target member.

When the bracket is provided with the fixed portion fixed to the antivibration connection target member as in this aspect, since the member dimensions (especially the thickness) are set based on the required characteristics such as load bearing performance, it is not realistic to change the thickness for mounting the positioning member. However, by providing the protrusion, it is possible to attach the common positioning member while satisfying the required performance of the bracket.

According to the third aspect, in the antivibration device according to the first or second aspect, a plurality of the protrusions are provided apart from one another in a circumferential direction.

According to the antivibration device constructed according to this aspect, for example, even though the protrusion has a hollow structure, by limiting the circumferential length of each protrusion, it is possible to easily ensure the deformation rigidity of the protrusion and prevent unintended deformation due to attachment of the positioning member.

Preferably, three or more protrusions are provided apart from one another in the circumferential direction. According to this, even if there is some error in the protrusion dimension of each protrusion, the positioning member can be stably attached.

According to the fourth aspect, in the antivibration device according to any one of the first to third aspects, the opposing surfaces of the positioning protruding portion and the locking claw in the positioning member are flat surfaces that expand perpendicularly to the penetrating direction of the attachment hole, and a tip surface of the protrusion is a flat surface that expands perpendicularly to the penetrating direction of the attachment hole.

According to the antivibration device constructed according to this aspect, the surfaces of the positioning member and the bracket, which are in contact with each other in the penetrating direction of the attachment hole, are both flat surfaces expanding perpendicularly to the penetrating direction of the attachment hole, which stabilizes the state of the positioning member attached to the bracket.

According to the fifth aspect, in the antivibration device according to any one of the first to fourth aspects, the attachment portion of the positioning member is divided into a plurality of parts in a circumferential direction.

According to the antivibration device constructed according to this aspect, when the locking claw of the positioning member is inserted into the attachment hole of the bracket, the divided attachment portion is deformed so as to contract toward the inner periphery, which allows the locking claw to easily pass through the attachment hole and facilitates the work of attaching the positioning member to the bracket.

According to the sixth aspect, in the antivibration device according to any one of the first to fifth aspects, the bracket is a press fitting, and the protrusion is press-molded.

According to the antivibration device constructed according to this aspect, the bracket having the protrusions can be easily obtained by press processing. In particular, since the protrusions can be formed during press molding of the bracket, there is no need to provide a special process for forming the protrusions, and an increase in the number of manufacturing processes due to the formation of the protrusions can be avoided.

According to the disclosure, it is possible to adopt a common positioning member for multiple types of brackets, in which the peripheral edge portions of the attachment holes have different thicknesses, in the antivibration device.

DESCRIPTION OF THE EMBODIMENTS

Hereinafter, embodiments of the disclosure will be described with reference to the drawings.

Figure 1:
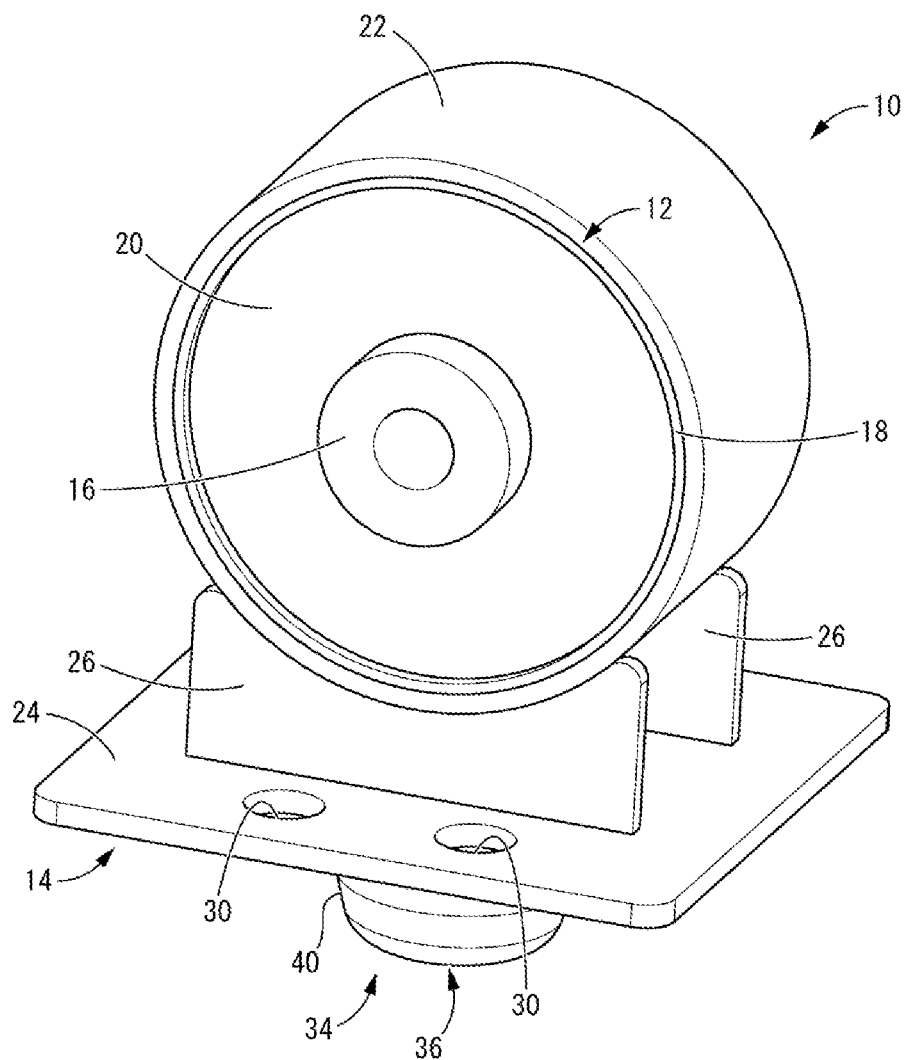
FIG. 1 is a perspective view showing an engine mount as the first embodiment of the disclosure.
Figure 2:
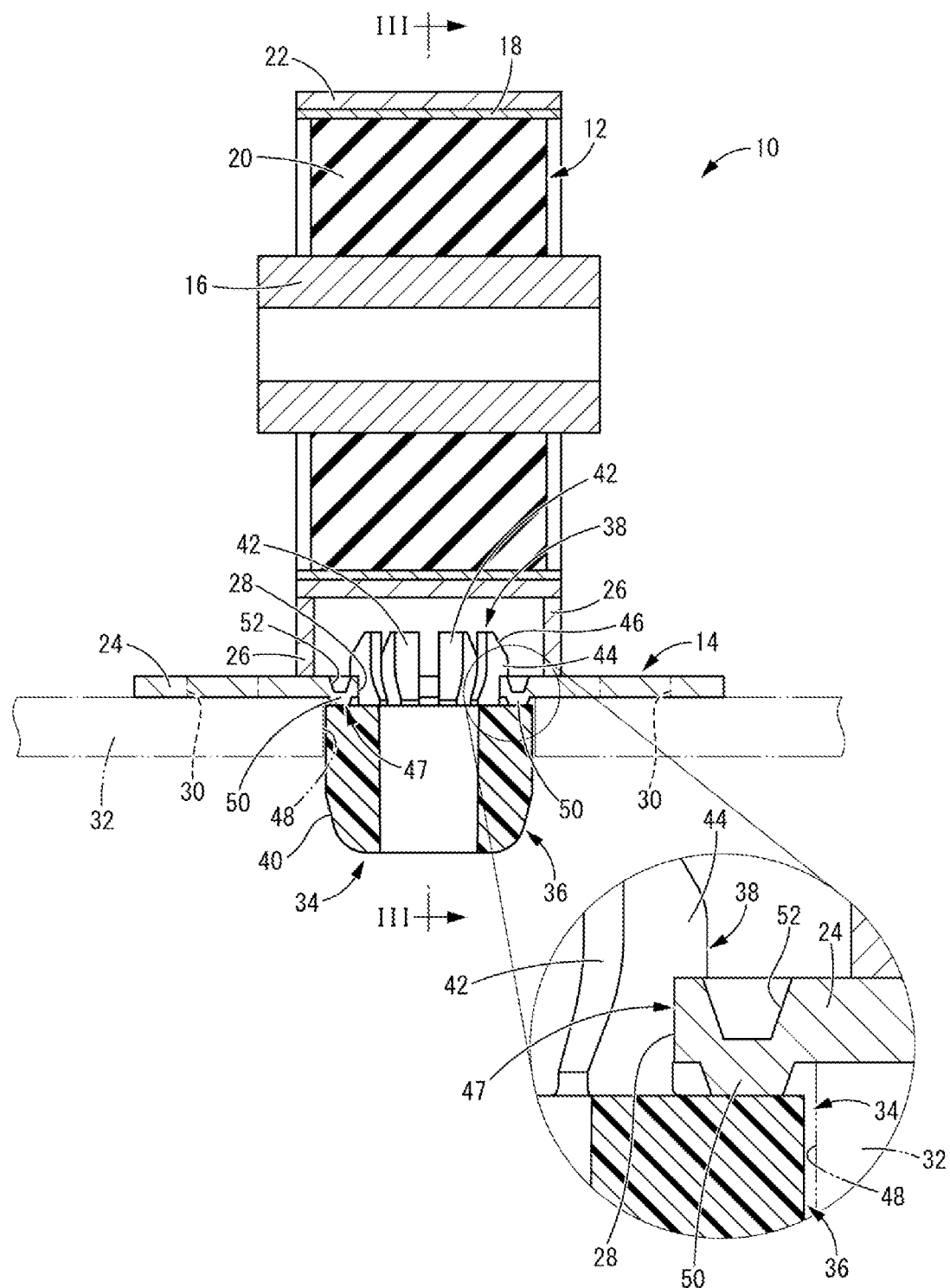
FIG. 2 is a vertical cross-sectional view of the engine mount shown in FIG. 1 and is a view corresponding to a cross section along the line II-II of FIG. 3.
Figure 3:
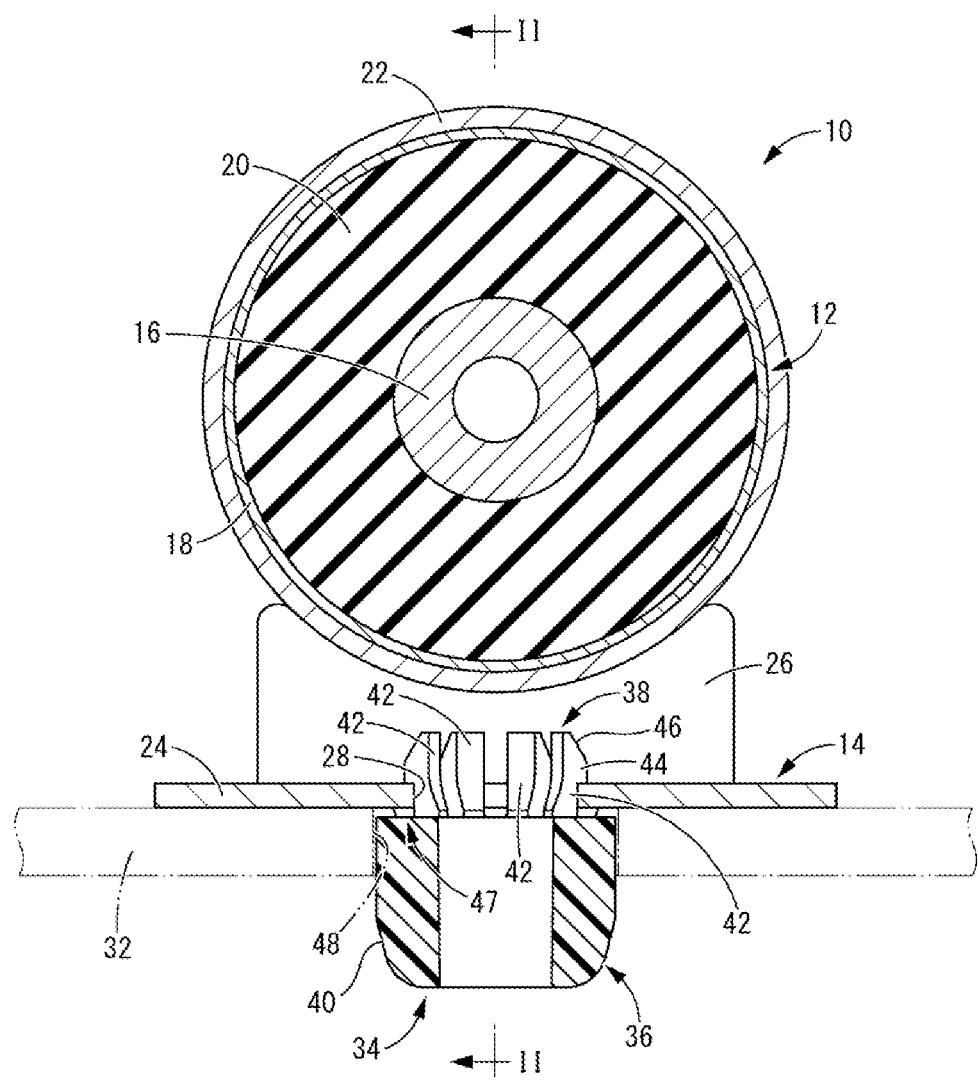
FIG. 3 is a cross-sectional view along the line III-III of FIG. 2.

FIG. 1 to FIG. 3 show an engine mount 10 for an automobile as the first embodiment of an antivibration device constructed according to the disclosure. The engine mount 10 is a bracket-equipped cylindrical antivibration device having a structure in which an outer bracket 14 as a bracket is mounted on a mount main body 12. The mount main body 12 has a structure in which an inner shaft member 16 and an outer cylindrical member 18 are connected by a main rubber elastic body 20. In the following description, as a general rule, the up-down direction refers to the up-down direction in FIG. 2, the front-rear direction refers to the left-right direction in FIG. 2, and the left-right direction refers to the left-right direction in FIG. 3, respectively.

The inner shaft member 16 has a substantially cylindrical shape with a small diameter that extends linearly in the front-rear direction. The inner shaft member 16 is a highly rigid member made of metal or fiber-reinforced synthetic resin or the like. The specific shape of the inner shaft member is not particularly limited, and the inner shaft member may have a columnar shape without a center hole and be provided with an attachment structure for a power unit or the like at an end in the axial direction, or may have a cross-sectional shape other than a circular shape such as a polygonal shape.

The outer cylindrical member 18 has a substantially cylindrical shape with a larger diameter than the inner shaft member 16. The outer cylindrical member 18 is a highly rigid member made of metal or fiber-reinforced synthetic resin or the like.

The inner shaft member 16 and the outer cylindrical member 18 are arranged on the same central axis. The inner shaft member 16 and the outer cylindrical member 18 are arranged to face each other while being separated from each other in the radial direction, and the main rubber elastic body 20 is disposed between the inner shaft member 16 and the outer cylindrical member in the radial direction. The main rubber elastic body 20 has a substantially cylindrical shape, 18 and the inner peripheral surface of which is vulcanized and bonded to the outer peripheral surface of the inner shaft member 16 and the outer peripheral surface of which is vulcanized and bonded to the inner peripheral surface of the outer cylindrical member 18. Thus, the inner shaft member 16 and the outer cylindrical member 18 are elastically connected in the radial direction by the main rubber elastic body 20 to form the mount main body 12. The main rubber elastic body 20 is formed as an integrally vulcanized molded product including the inner shaft member 16 and the outer cylindrical member 18. The inner shaft member 16 and the outer cylindrical member 18 protrude toward both sides in the front-rear direction with respect to the main rubber elastic body 20.

Figure 4:
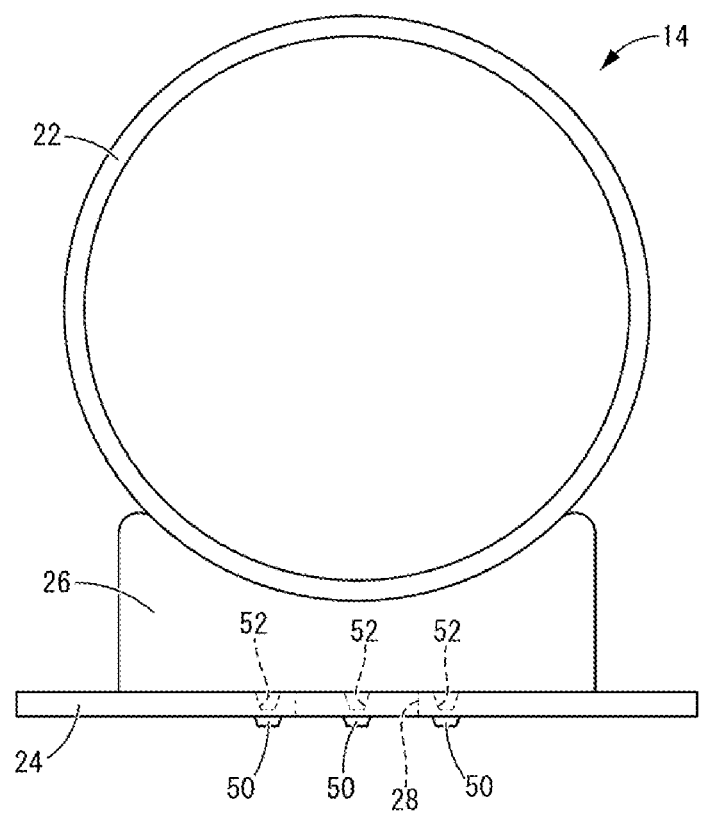
FIG. 4 is a front view of an outer bracket that constitutes the engine mount shown in FIG. 1.
Figure 5:
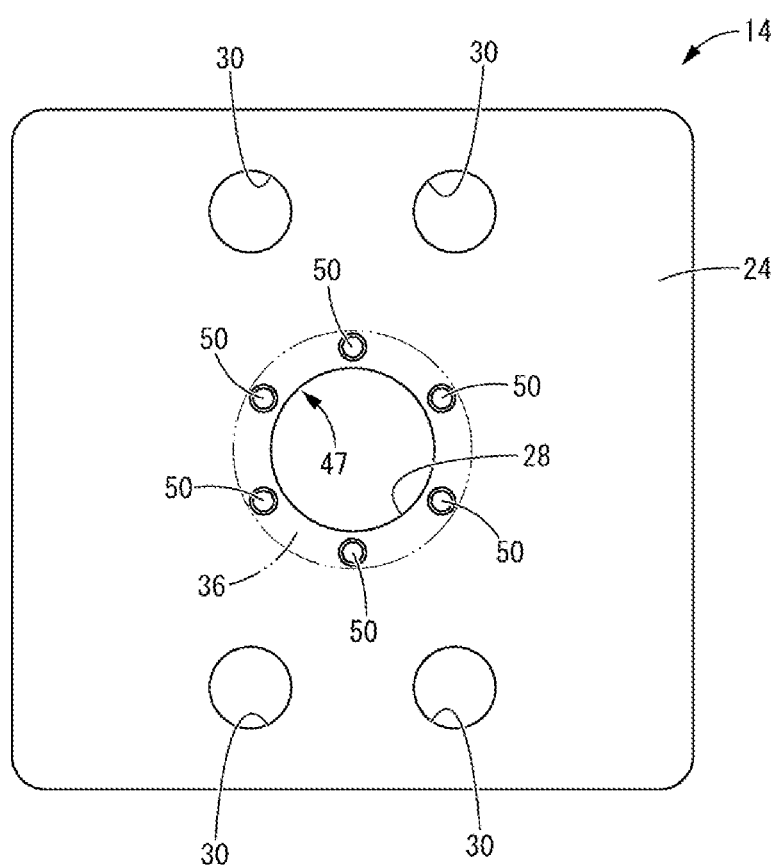
FIG. 5 is a bottom view of the outer bracket shown in FIG. 4.

As shown in FIG. 1 to FIG. 3, the outer bracket 14 is attached to the outer cylindrical member 18 of the mount main body 12. Also, as shown in FIG. 4 and FIG. 5, the outer bracket 14 has a structure in which a mounting cylindrical portion 22 and a fixed portion 24 are connected to each other by a connecting portion 26.

The mounting cylindrical portion 22 has a substantially cylindrical shape with a larger diameter than the outer cylindrical member 18. Then, the outer bracket 14 is attached to the mount main body 12 by press-fitting and fixing the outer cylindrical member 18 into the mounting cylindrical portion 22.

The fixed portion 24 has a substantially rectangular plate shape, and an attachment hole 28 having a substantially circular cross section is formed to penetrate the central portion in the thickness direction. The fixed portion 24 has bolt holes 30 formed on both front and rear sides of the attachment hole 28. The bolt hole 30 is a circular hole with a smaller diameter than the attachment hole 28, and two bolt holes 30 are provided on both front and rear sides of the attachment hole 28 and are separated from each other in the left-right direction. Then, the fixed portion 24 is fixed to a vehicle body 32, which is an antivibration connection target member, with bolts (not shown) inserted into the bolt holes 30, so that the outer bracket 14 is attached to the vehicle body 32, as shown in FIG. 2 and FIG. 3. The fixed portion 24 is, for example, a press fitting formed by pressing a metal base plate.

The mounting cylindrical portion 22 and the fixed portion 24 are connected to each other by the connecting portion 26 shown in FIG. 1 to FIG. 4. The connecting portion 26 has a plate shape expanding substantially perpendicularly to the front-rear direction, and has a concave curved surface with an upper end surface along the outer peripheral surface of the mounting cylindrical portion 22. The connecting portion 26 has an upper end fixed to the outer peripheral surface of the mounting cylindrical portion 22 and a lower end fixed to the upper surface of the fixed portion 24, thereby connecting the mounting cylindrical portion 22 and the fixed portion 24. In this embodiment, a pair of connecting portions 26 are arranged facing each other and separated from each other in the front-rear direction, and the connecting portions 26 are fixed to the mounting cylindrical portion 22 and the fixed portion 24 at two positions in the front-rear direction. Thus, the mounting cylindrical portion 22 and the fixed portion 24 are fixed more firmly, and relative displacement between the mounting cylindrical portion 22 and the fixed portion 24 is prevented. The front and rear two sets of bolt holes 30 provided in the fixed portion 24 are arranged on both front and rear outer sides with respect to the connecting portions 26, as shown in FIG. 1. Moreover, the attachment hole 28 is arranged between the pair of front and rear connecting portions 26. The mounting cylindrical portion 22, the fixed portion 24, and the connecting portions 26 are fixed by welding, for example.

Figure 6:
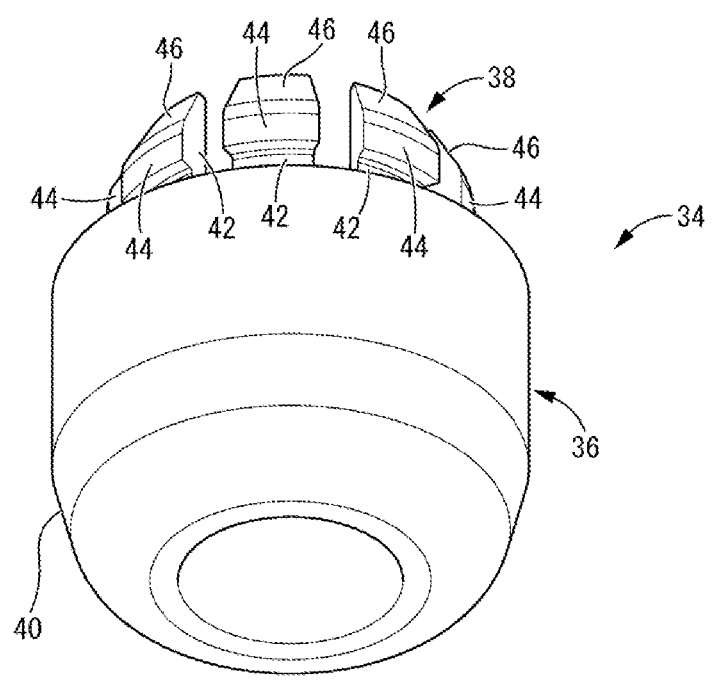
FIG. 6 is a perspective view of a cap that constitutes the engine mount shown in FIG. 1.
Figure 7:
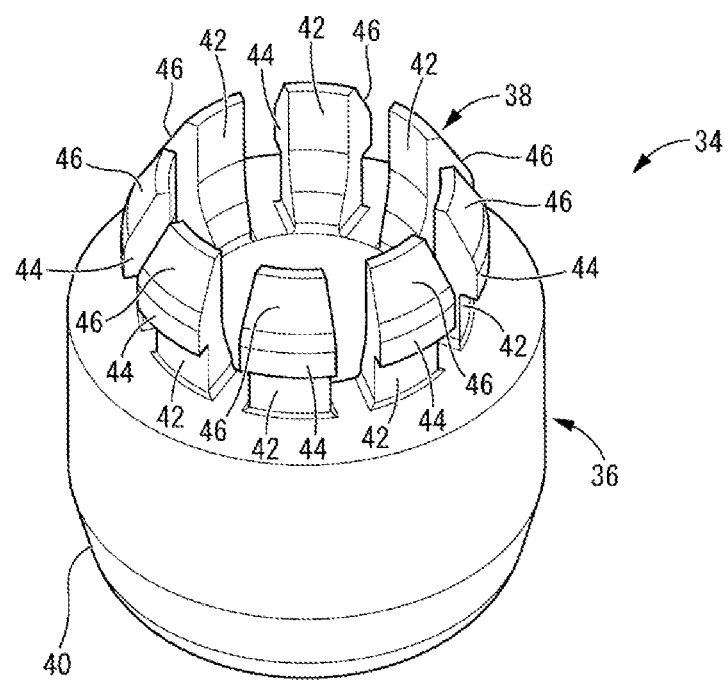
FIG. 7 is a perspective view showing the cap shown in FIG. 6 from another angle.

A cap 34 as a positioning member is attached to the fixed portion 24 of the outer bracket 14. As shown in FIG. 6 and FIG. 7, the cap 34 includes a cylindrical positioning protruding portion 36 and an attachment portion 38 protruding upward from the positioning protruding portion 36. Although the cap 34 of this embodiment is made of synthetic resin, the cap 34 may be made of metal or the like, for example.

The positioning protruding portion 36 has a cylindrical upper portion extending in the up-down direction with a substantially constant outer diameter, and a lower portion serving as a tapered guide portion 40 with a diameter decreasing downward. The upper surface of the positioning protruding portion 36 is a flat surface that expands substantially perpendicularly to the up-down direction.

The attachment portion 38 protrudes upward from the peripheral edge portion of the upper end opening of the center hole of the positioning protruding portion 36 and has a substantially cylindrical shape as a whole. The attachment portion 38 of this embodiment is integrally formed with the positioning protruding portion 36. The attachment portion 38 is divided into eight parts in the circumferential direction, and is composed of eight locking pieces 42 that are arranged apart from one another in the circumferential direction.

The locking piece 42 has a plate shape with the radial direction being the thickness direction, and elastic bending deformation in the radial direction is allowed. A locking claw 44 protruding toward the outer periphery is provided at the protruding tip portion of the locking piece 42. A lower surface of the locking claw 44 is a flat surface that expands substantially perpendicularly to the up-down direction, and an upper surface is an inclined surface 46 that inclines upward and toward the inner periphery.

The outer diameter of the upper end of the attachment portion 38 composed of the eight locking pieces 42 is made smaller than the opening diameter of the attachment hole 28. The outer diameter of the attachment portion 38 at the lower end of the locking claw 44 is larger than the opening diameter of the attachment hole 28. The outer diameter of the attachment portion 38 below the locking claw 44 is substantially the same as the opening diameter of the attachment hole 28.

The cap 34 constructed as described above is attached to the outer bracket 14. That is, the attachment portion 38 of the cap 34 is inserted through the attachment hole 28 of the fixed portion 24 constituting the outer bracket 14, and the peripheral edge portion (peripheral plate portion) 47 of the attachment hole 28 is sandwiched between the positioning protruding portion 36 and the locking claw 44 of the cap 34 in the up-down direction, so that the cap 34 is positioned in the up-down direction with respect to the fixed portion 24.

When the attachment portion 38 of the cap 34 is inserted into the attachment hole 28 of the fixed portion 24, since the inclined surface 46 on the insertion tip side is pressed against the peripheral edge portion 47 of the attachment hole 28, a force directed toward the inner periphery acts on the locking pieces 42 constituting the attachment portion 38. Thus, each locking piece 42 is elastically bent and deformed toward the inner peripheral side, and the attachment portion 38 is inserted through the attachment hole 28 with the diameter reduced. Then, when the locking claw 44 passes through the attachment hole 28 and the contact between the locking claw 44 and the peripheral edge portion 47 of the attachment hole 28 is released, the force on the locking pieces 42 is released and the locking pieces 42 elastically restore the original shape. Thus, the locking claw 44 moves to the upper side of the peripheral edge portion 47 of the attachment hole 28, and the locking of the locking claw 44 to the peripheral edge portion 47 of the attachment hole 28 prevents the locking claw 44 from being pulled downward relative to the attachment hole 28 of the attachment portion 38. In this way, even if the locking claw 44 protruding toward the outer periphery is provided at the tip portion (upper end portion) of the attachment portion 38 by dividing the attachment portion 38 into a plurality of locking pieces 42 in the circumferential direction, the locking claw 44 can pass through the attachment hole 28 and the attachment portion 38 can be inserted through the attachment hole 28.

The cap 34 attached to the fixed portion 24 constitutes a positioning mechanism that positions the engine mount 10 and the vehicle body 32 in the front-rear direction and the left-right direction by inserting the positioning protruding portion 36 protruding downward from the fixed portion 24 into the positioning hole 48 provided in the vehicle body 32 (the antivibration connection target member). As shown in FIG. 2 and FIG. 3, the positioning hole 48 of this embodiment is a through hole, but the positioning hole 48 may have a recessed shape with a bottom.

Figure 8:
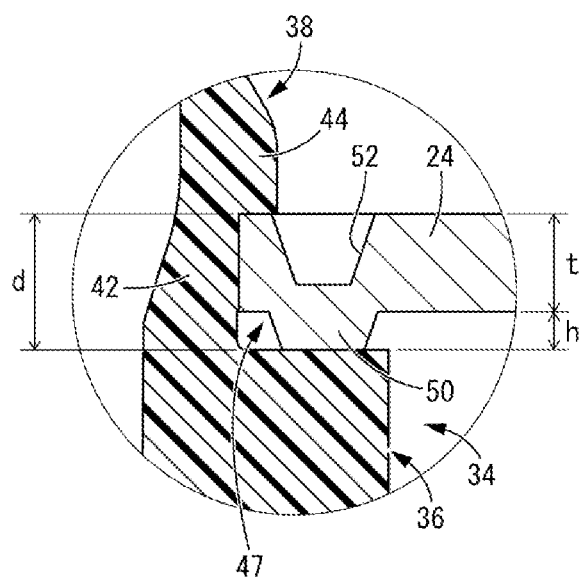
FIG. 8 is an enlarged vertical cross-sectional view showing an attachment structure of the cap in the engine mount shown in FIG. 1.

In this embodiment, the plate thickness t of the fixed portion 24 is smaller than the distance d between the opposing surfaces of the positioning protruding portion 36 and the locking claw 44 in the cap 34 in the up-down direction (see FIG. 8). Therefore, a plurality of protrusions 50 are provided on the peripheral edge portion 47 of the attachment hole 28 in the fixed portion 24. The protrusion 50 of this embodiment is formed by pushing out the fixed portion 24 in the peripheral edge portion 47 of the attachment hole 28 downward from above to protrude downward. Accordingly, as shown in FIG. 2 and FIG. 8, the protrusion 50 has a hollow structure with a concave portion 52 that opens on the upper surface.

Further, the protrusion 50 has a substantially truncated conical shape that is turned upside down, and the outer peripheral surface of the protrusion 50 is a tapered surface that becomes smaller in diameter toward the lower protruding tip, and is tapered downward. The protrusions 50 are shaped like spots that are discontinuous in the circumferential direction, and six protrusions 50 are separated from one another at substantially equal intervals in the circumferential direction. The lower surface, which is the tip surface of the protrusion 50, is a flat surface that expands substantially perpendicularly to the up-down direction. The upper surface of the fixed portion 24 in the portion outside the concave portion 52 a flat surface that expands substantially parallel to the lower surface of the protrusion 50.

In this embodiment, the fixed portion 24 is a press fitting, and the protrusion 50 is formed during the press processing for molding the fixed portion 24. Thus, a special process for forming the protrusion 50 is not required, and the fixed portion 24 having the protrusions 50 can be easily obtained without increasing the number of manufacturing processes.

Then, when the cap 34 is attached to the fixed portion 24, the upper surface of the positioning protruding portion 36 of the cap 34 abuts the tip surface (lower surface) of the protrusion 50 of the fixed portion 24, and the lower surface of the locking claw 44 of the cap 34 abuts the upper surface of the peripheral edge portion 47 of the attachment hole 28 in the fixed portion 24. Here, as shown in FIG. 8, the height h of the protrusion 50 is set so that the sum (t+h) of the plate thickness t of the fixed portion 24 and the height h of the protrusion 50 is substantially the same as the distance d between the opposing surfaces of the upper surface of the positioning protruding portion 36 and the lower surface of the locking claw 44. In short, the vertical thickness of the peripheral edge portion 47 of the fixed portion 24 is adjusted and set by the protrusion 50. Thus, even when the plate thickness t of the fixed portion 24 is smaller than the distance d between the opposing surfaces of the upper surface of the positioning protruding portion 36 and the lower surface of the locking claw 44, the fixed portion 24 can be sandwiched between the positioning protruding portion 36 and the locking claw 44 in the up-down direction to fix the cap 34 to the fixed portion 24.

By adjusting and setting the height h of the protrusion 50, the cap 34 can be attached to the fixed portion 24 without making any change to the plate thickness t of the fixed portion 24 and the distance d between the opposing surfaces of the upper surface of the positioning protruding portion 36 and the lower surface of the locking claw 44. Accordingly, it is possible to attach the cap 34 having the predetermined distance d to multiple types of fixed portions 24 having different plate thicknesses t, and a common cap 34 can be employed for multiple types of outer brackets 14 in which the plate thicknesses t of the fixed portions 24 are different. Moreover, there is no need to consider attachment of the cap 34 when setting the plate thickness t of the fixed portion 24, and it becomes easy to set the plate thickness t of the fixed portion 24, which is the portion to be attached to the vehicle body 32, in accordance with the required performance such as the strength and the attachment structure to the vehicle body 32.

The tip surface of the protrusion 50 is positioned away from the attachment hole 28 on the outer periphery, but the upper surface of the positioning protruding portion 36 expands further to the outer periphery side with respect to the lower surface of the locking claw 44 so the upper surface of the positioning protruding portion 36 can be brought into contact with the tip surface of the protrusion 50.

By providing the protrusions 50 at a plurality of positions in the circumferential direction, the contact reaction force of the protrusions 50 acts on the cap 34 in a well-balanced manner in the circumferential direction, and the inclination of the positioning protruding portion 36 is less likely to occur. In particular, a plurality of protrusions 50 are provided independently, and the protrusions 50 are respectively in contact with the positioning protruding portion 36 at positions spaced apart in the circumferential direction, so that variation in the contact state due to errors in the height of the protrusions 50 and unevenness of the upper surface of the positioning protruding portion 36 is unlikely to pose a problem.

The tip surface of the protrusion 50 on the fixed portion 24 and the upper surface of the portion of the peripheral edge portion 47 of the attachment hole 28 outside the concave portion 52 are both flat surfaces expanding substantially perpendicularly to the up-down direction. Further, both the upper surface of the positioning protruding portion 36 and the lower surface of the locking claw 44 of the cap 34 are flat surfaces that expand substantially perpendicularly to the up-down direction. Therefore, the tip surface of the protrusion 50 and the upper surface of the positioning protruding portion 36, and the upper surface of the peripheral edge portion 47 of the attachment hole 28 and the lower surface of the locking claw 44 are respectively brought into contact with each other in a stable manner, and the state of the cap 34 being attached to the fixed portion 24 is stabilized. Furthermore, when an external force acts on the cap 34 in a direction of detaching the cap 34 from the fixed portion 24, the locking between the upper surface of the peripheral edge portion 47 of the attachment hole 28 and the lower surface of the locking claw 44 effectively exerts a retaining effect.

Figure 9:
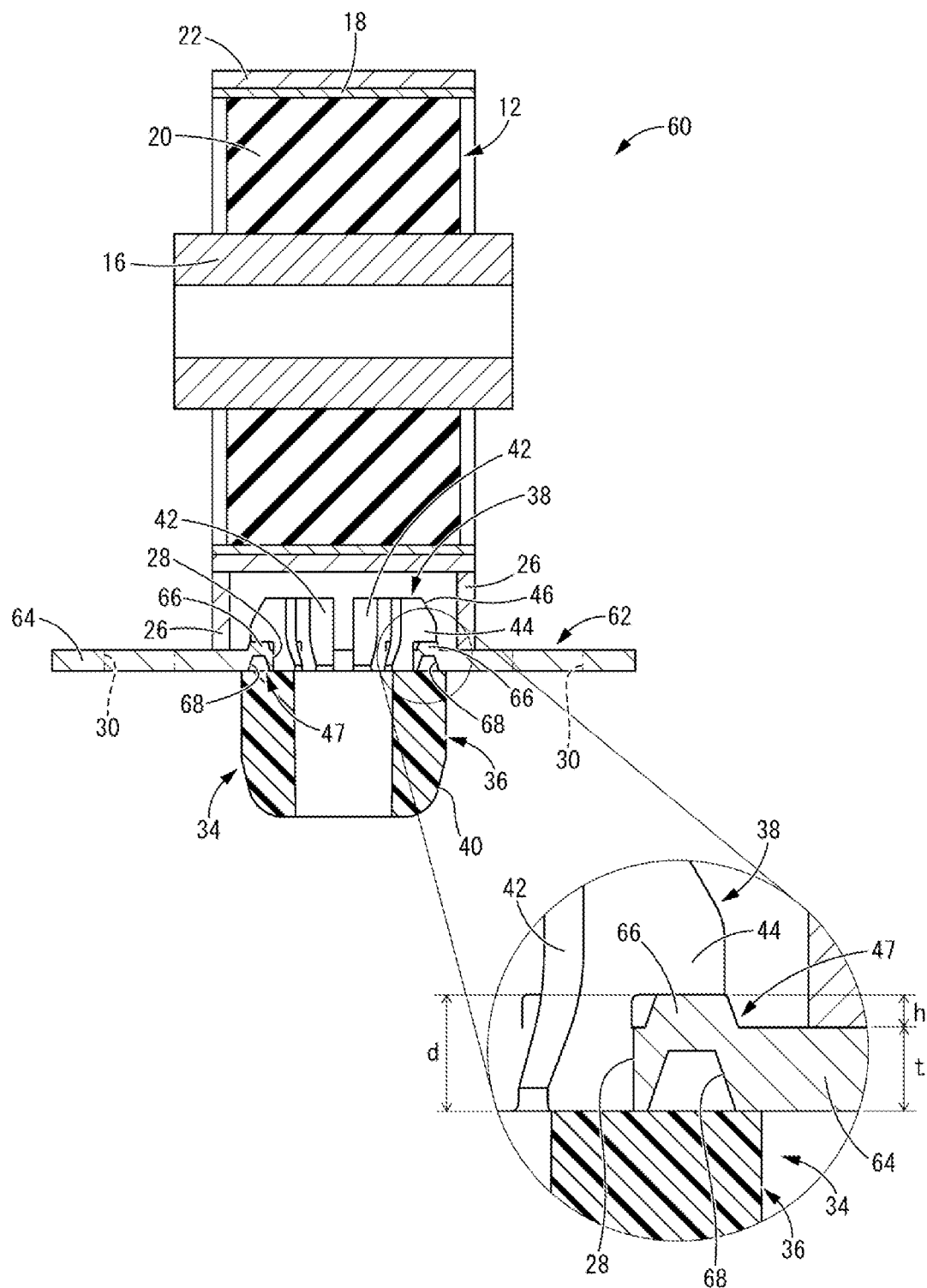
FIG. 9 is a vertical cross-sectional view showing an engine mount as the second embodiment of the disclosure.

FIG. 9 shows an engine mount 60 as the second embodiment of the disclosure. The engine mount 60 has a structure in which the cap 34 is attached to a fixed portion 64 of an outer bracket 62. In the following description, members and parts that are substantially the same as those of the first embodiment are denoted by the same reference numerals in the drawings, and the description thereof is omitted.

The fixed portion 64 has protrusions 66 on the peripheral edge portion 47 of the attachment hole 28. The protrusion 66 protrudes upward in the peripheral edge portion 47 of the attachment hole 28. The protrusion 66 has a substantially truncated conical shape, and has a tapered shape with a smaller diameter toward the protruding tip. The protrusion 66 has a hollow structure formed by a concave portion 68 that opens on the lower surface of the fixed portion 64. The protrusion 66 of this embodiment is formed by press processing when the fixed portion 64 is press-molded, for example, similarly to the protrusion 50 of the first embodiment.

Then, the attachment portion 38 of the cap 34 is inserted through the attachment hole 28 of the fixed portion 64, and the peripheral edge portion 47 of the attachment hole 28 in the fixed portion 64 is sandwiched between the upper surface of the positioning protruding portion 36 and the lower surface of the locking claw 44 of the cap 34, thereby attaching the cap 34 to the fixed portion 64.

The plate thickness t of the fixed portion 64 is made smaller than the distance d between the opposing surfaces of the upper surface of the positioning protruding portion 36 and the lower surface of the locking claw 44, and the sum of the plate thickness t of the fixed portion 64 and the height h of the protrusion 66 is substantially the same as the distance d between the opposing surfaces of the upper surface of the positioning protruding portion 36 and the lower surface of the locking claw 44. Then, the upper surface of the positioning protruding portion 36 is overlapped with the lower surface of the fixed portion 64 in a contact state, and the lower surface of the locking claw 44 is overlapped with the tip surface (upper surface) of the protrusion 66 in a contact state, so that the fixed portion 64 is sandwiched between the positioning protruding portion 36 and the locking claw 44 of the cap 34. Thus, the cap 34 is stably attached to the fixed portion 64 which is thinner than the distance d between the opposing surfaces of the upper surface of the positioning protruding portion 36 and the lower surface of the locking claw 44.

Since the tip surface of the protrusion 66 is arranged at a position away from the attachment hole 28 toward the outer periphery, the protrusion dimension of the locking claw 44 is made large so as to be overlapped with the tip surface of the protrusion 66. Furthermore, preferably, the interval between the locking claws 44 adjacent in the circumferential direction is made smaller than the circumferential width of the tip surface of the protrusion 66. As a result, regardless of the orientation of the cap 34 in the circumferential direction, the locking claw 44 and the protrusion 66 can be overlapped while being in contact with each other.

As can be understood from the description of the above embodiments, the disclosure is a set of multiple types of brackets configured by flat plate-shaped peripheral plate portions having different thicknesses t around the attachment holes, and can also grasp it as a bracket set that, by forming a protrusion that is positioned on the peripheral plate portion and protrudes in the thickness direction at least on brackets other than the bracket whose peripheral plate portion has the maximum thickness, the thickness of the peripheral plate portion including the protruding height of the protrusion is made equal when the substantial thickness-direction dimension of each of the peripheral plate portions in the multiple types of brackets is t+h, that is, having a protrusion. In the bracket set composed of a combination of multiple types of brackets, it is also possible to attach the same cap 34 to each attachment hole 28, and at least the distance d between the opposing surfaces of the cap 34 attached to each attachment hole 28 can be made uniform, the shape and size of the attachment portions 38 can be made uniform, and even if the shape and size of the positioning protruding portion 36 are changed, the design and manufacture can be facilitated. It should be noted that the multiple types of brackets described above may differ from each other not only in plate thickness but also in overall shape and dimensions.

Although the embodiments of the disclosure have been described in detail above, the disclosure is not limited to the specific description. For example, the protrusions are not limited to the spot-like shape shown in the above embodiments, and may have, for example, a shape extending in the circumferential direction. In this case, the protrusion may be formed in an annular shape that is continuous over the entire periphery in the peripheral edge portion 47 of the attachment hole 28, or a plurality of protrusions may be provided to extend by a length less than a full circle.

The protrusions are preferably formed by press processing the fixed portion 24. For example, the protrusions may be provided integrally with the fixed portion 24 by cutting, etching or the like, or may be provided by fixing another component to the fixed portion 24.

The attachment portion 38 of the cap 34 is not necessarily divided into a plurality of parts. For example, if the attachment portion 38 is made flexible to some extent and can be deformed to be inserted into the attachment hole 28, the attachment portion 38 can be formed in a cylindrical shape.

The positioning protruding portion 36 and the attachment portion 38 are not necessarily integrally formed on the cap 34. For example, the cap as the positioning member may have the attachment portion 38 made of synthetic resin and the positioning protruding portion 36 made of metal. In addition, the cap may be formed by two-color molding of the positioning protruding portion 36 and the attachment portion 38 with different synthetic resin materials, for example.

Although the above embodiments illustrate a structural example in which the cap 34 is attached to the fixed portion 24 of the outer bracket 14 to protrude downward, the cap 34 may be provided to protrude laterally or upward with respect to the fixed portion 24.

Although the above embodiments illustrate an example in which the disclosure is applied to a cylindrical antivibration device, the disclosure can also be applied to an antivibration device not in a cylindrical shape and can be applied to, for example, the engine mount disclosed in Patent Document 1 (Japanese Patent Laid-Open No. 2015-218754). In Patent Document 1, the cap is attached to cover the nut, but the structure of the disclosure in which the attachment portion of the cap is inserted into the attachment hole to be attached may be applied as the attachment structure of the cap.

The structure of the outer bracket 14 is not particularly limited, and for example, the specific structure of the fixed portion 24 can be changed as appropriate according to the required attachment structure for the vehicle body 32. For example, the fixed portion 24 may be provided with stud bolts instead of or in addition to the bolt holes 30 of the fixed portion 24.

What is claimed is:

1. An antivibration device comprising a bracket fixed to an antivibration connection target member, wherein
a positioning member is attached to an attachment hole formed through the bracket,
the positioning member comprises a positioning protruding portion inserted into a positioning hole of the antivibration connection target member and positioning the bracket with respect to the antivibration connection target member; and a cylindrical attachment portion extending from the positioning protruding portion and inserted into the attachment hole of the bracket,
a protruding tip portion of the attachment portion is provided with a locking claw protruding toward an outer periphery,
the positioning member is positioned with respect to the bracket in a penetrating direction of the attachment hole by sandwiching a peripheral edge portion of the attachment hole between opposing surfaces of the positioning protruding portion and the locking claw, and the peripheral edge portion of the attachment hole in the bracket is provided with a protrusion that protrudes in the penetrating direction of the attachment hole to adjust and set a thickness of the peripheral edge portion of the attachment hole.

2. The antivibration device according to claim 1, wherein the bracket is provided with a fixed portion fixed to the antivibration connection target member, wherein the fixed portion is an approximately rectangular plate that is fixed to the antivibration connection target member.

3. The antivibration device according to claim 1, further comprising a plurality of the protrusions provided apart from one another in a circumferential direction.

4. The antivibration device according to claim 1, wherein the opposing surfaces of the positioning protruding portion and the locking claw in the positioning member are flat surfaces that expand perpendicularly to the penetrating direction of the attachment hole, and a tip surface of the protrusion is a flat surface that expands perpendicularly to the penetrating direction of the attachment hole.

5. The antivibration device according to claim 1, wherein the attachment portion of the positioning member is divided into a plurality of parts in a circumferential direction.

6. The antivibration device according to claim 1, wherein the bracket is a press fitting, and the protrusion is press-molded.

* * * * *